B. F. RINDFLEISCH.
OVERLOAD CLUTCH.
APPLICATION FILED APR. 22, 1914.

1,118,683.  Patented Nov. 24, 1914.

Witnesses:
R. W. Pittman
F. E. Boyce

Benjamin F. Rindfleisch
Inventor
By his Attorney

UNITED STATES PATENT OFFICE.

BENJAMIN FRANKLIN RINDFLEISCH, OF CLEVELAND, OHIO, ASSIGNOR TO THE NATIONAL ACME MANUFACTURING COMPANY, OF CLEVELAND, OHIO, A CORPORATION OF OHIO.

OVERLOAD-CLUTCH.

1,118,683. Specification of Letters Patent. Patented Nov. 24, 1914.

Application filed April 22, 1914. Serial No. 833,585.

*To all whom it may concern:*

Be it known that I, BENJAMIN F. RINDFLEISCH, a citizen of the United States, residing at Cleveland, in the county of Cuyahoga and State of Ohio, have invented certain new and useful Improvements in Overload-Clutches, of which the following is a specification.

The present improvement relates to clutches, and more particularly to that class thereof known as overload clutches, the object of the invention being to provide an improved overload clutch which will be positive in its action and so avoid the wear which is always present in a friction clutch, and which clutch will be simple in construction and durable and effective in use.

Figure 1:
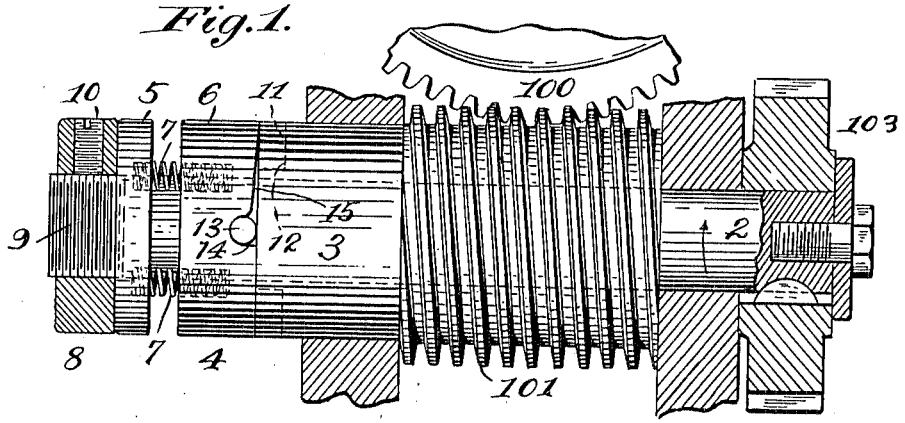
Figure 2:
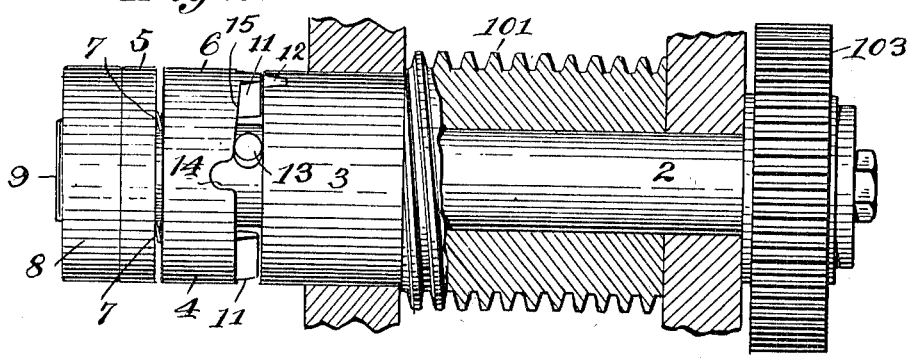
Figure 3:
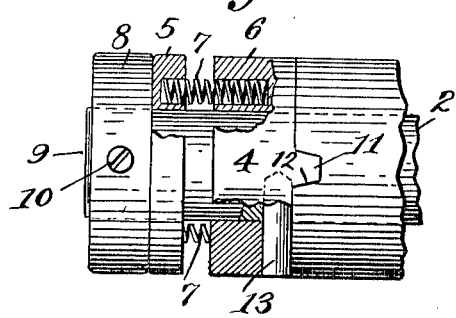
Figure 4:
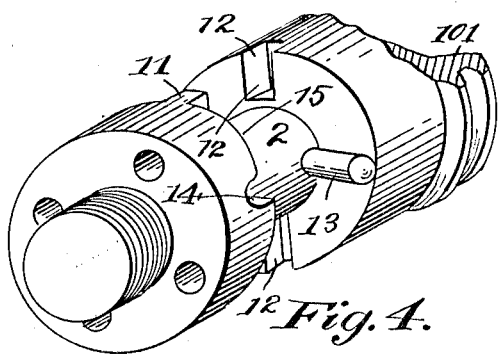

In the drawings accompanying and forming part of this specification, Figure 1 is a side, partly sectional, view of this improved clutch, showing one position thereof; Fig. 2 is a substantially similar view, showing another position thereof; Fig. 3 is a detail, partly sectional view of the clutch end of the mechanism; and Fig. 4 is a perspective view of the clutch end of the mechanism, showing the clutch members separated.

Similar characters of reference indicate corresponding parts in the several figures of the drawings.

The clutch, in the preferred form thereof shown, comprises a driving member and a driven member, which latter is adapted to drive various kinds of mechanism, but in the present instance it is shown driving a worm wheel 100 through the medium of a worm 101. Any suitable means may be utilized for driving the clutch, but in the present instance a driving spur gear 103 is shown. This gear is fixed to a shaft 2 suitably supported in any desired way, and loosely mounted on this shaft is located the worm 101, which in the present instance is formed as a part of one of the clutch members. Loosely mounted on the shaft 2 is another clutch member 4, which member comprises a pair of members or collars 5 and 6 connected together by a series, shown as four in number, of spiral spring 7. Secured to the shaft 2 at the outside of the member 5 is an adjusting nut 8, which nut is turned on to the threaded end 9 of the shaft 2, and is maintained in place by a set screw 10. The members 3 and 6 of the clutch are provided with cooperating lugs or teeth 11 and 12 respectively. Secured to the shaft 2, between the members 3 and 6 of the clutch, is a driving pin 13, which pin, when the clutch members 3 and 6 are in engagement, is normally carried in a recess 14 of the clutch member 6, and the clutch member 6 is provided with a cam surface 15 of sufficient inclination or pitch to enable the pin 13 to completely separate the teeth 11 thereof from the complementary teeth 12 formed by the recesses of the member 3 when the driven mechanism is under an overload. The springs between the members 5 and 6 normally maintain the member 6 under pressure and the cooperating teeth 11 and 12 in engagement, at which time the pin 13 is within the recess 14 in the manner shown in Fig. 1, whereupon motion will be transmitted from the driving member of the clutch to the driven member and thereby to the worm 101 and worm wheel 100. From this it will be observed that from one point of view the driving member may be said to consist in the present instance of a laterally extending pin carried by a rotating member or shaft, while the driven member comprises a plurality of clutch members separable one from another, but from another point of view it may be said that the driving member consists of a laterally extending pin carried by a rotatable member or shaft and a spring-pressed member adapted to cooperate therewith and carrying means or teeth for cooperating with similarly formed teeth of the driven member.

The adjusting nut 8 is for the purpose of increasing the tension of the springs; in other words, to regulate the resistance of the springs, the greater the tension that is placed on the springs the greater the load the clutch will carry without separation of the clutch members. When too great a load is placed on the clutch mechanism it overcomes the resistance of the springs, and in consequence the pin 13 is forced out of its recess and into the cam path between the clutch members 3 and 6, whereupon, by reason of the inclination of this cam path, the clutch member 6 is forced away from the member 3 and the teeth of the two members separated, whereupon further rotation of the member 3 and the worm 101 ceases and strain upon the mechanism is relieved. In short, when the amount of power required to drive the worm exceeds the pressure of the springs and the resistance of the angle on the lugs or coöperating teeth and the pin groove, the springs are then compressed, allowing the member 6 of the clutch member 4 to be forced away from the member 3 of the clutch by the pin engaging with the cam or inclined surface adjacent to the recess. This camming movement is aided by the normal action of the tapered sides of the teeth as the teeth are withdrawn from their coöperating recesses or teeth.

When the springs are compressed as shown in Fig. 2, the relation of the shaft 2, adjusting nut 8, clutch members 5, and 6, and pin 13 remain the same and all revolve together. But as the teeth 11 have been separated from the coöperating teeth 12 of the clutch member 6 the clutch member 3 and the means driven thereby, in the present instance the worm, stand idle. It will be noted that the clutch members 5 and 6 are free on the shaft except when the recess 14 of the member 6 is in engagement with the driving pin 13, but that the tension of the springs and the action of the driving pin 13 cause the members 5 and 6 to rotate with the shaft when the machine is under load, and when under load, with the driving pin in its recess, the bearing of the recess and pin is sufficient to drive the machine under normal load, especially as the recess is maintained in contact with the pin 13 by the tension of the springs. When the driving and driven clutch members have separated by a reasonable overload they may be re-set in any suitable manner, usually by means of a crank provided for that purpose.

I claim as my invention:

1. An overload clutch comprising a driven member having a clutch face, and a driving member including a fixed part and a loosely mounted part also having a coöperating clutch face and a cam surface and recess coöperating with said fixed part, and means for normally maintaining said clutch faces in engagement.

2. An overload clutch comprising a driven member having a clutch face, and a driving member comprising a rotary shaft extending through said driven member and including a fixed part and a loosely mounted part thereon also having a coöperating clutch face and a cam surface and recess coöperating with said fixed part, and means for normally maintaining said clutch faces in engagement.

3. An overload clutch comprising a driven member having a clutch face, and a driving member including a rotating member having a laterally extending pin and a loosely mounted part also having a coöperating clutch face and a cam surface and recess coöperating with said pin, and means for normally maintaining said clutch faces in engagement.

4. An overload clutch comprising a driven member having a clutch face, and a driving member including a fixed part and a loosely mounted spring-pressed member also having a coöperating clutch face and a cam surface and recess coöperating with said fixed part.

5. An overload clutch comprising a driven member having a clutch face, a driving member including a fixed part and a loosely mounted spring-pressed member also having a coöperating clutch face and a cam surface and recess coöperating with said fixed part, and means for increasing or decreasing the spring pressure on said loosely mounted member.

6. An overload clutch comprising a driven member having a clutch face, and a driving member including a rotary shaft extending through said driven member and having a laterally extending fixed pin and a loosely mounted member carried by said shaft and also having a coöperating clutch face and a cam surface and recess coöperating with said pin, and means for normally maintaining said clutch faces in engagement.

7. An overload clutch comprising a driven member having a clutch face, a driving member including a rotary shaft extending through said driven member and having a laterally extending fixed pin and a loosely mounted member carried by said shaft and also having a coöperating clutch face and a cam surface and recess coöperating with said pin, and means for maintaining said coöperating clutch faces in engagement.

8. An overload clutch comprising a driven member having a clutch face, a driving member including a rotary shaft extending through said driven member and having a laterally extending fixed pin and a loosely mounted member carried by said shaft and also having a coöperating clutch face and a cam surface and recess coöperating with said pin, and means for maintaining said coöperating clutch faces in engagement and comprising one or more springs.

9. An overload clutch comprising a driven member having a clutch face, a driving member including a rotary shaft extending through said driven member and having a laterally extending fixed pin and a loosely mounted member carried by said shaft and also having a coöperating clutch face and a cam surface and recess coöperating with said pin, and means for maintaining said coöperating clutch faces in engagement and comprising a plurality of spiral compression springs.

10. An overload clutch comprising a driven member having a clutch face, a driving member including a rotary shaft extending through said driven member and having a laterally extending fixed pin and a loosely mounted member carried by said shaft and also having a coöperating clutch face and a cam surface and recess coöperating with said pin, and means for maintaining said coöperating clutch faces in engagement and comprising a plurality of spiral compression springs and means for increasing the resistance of said springs.

11. An overload clutch comprising a rotary shaft having a laterally extending pin, a driven member loosely mounted thereon at one side of said pin and having clutch teeth, a two-part driving member also loosely mounted on said shaft at the opposite side of said pin, one of said members having coöperating clutch teeth and a cam surface and recess for coöperating with said pin, and a spring or springs located between said two-part member for maintaining the coöperating clutch teeth in engagement.

12. An overload clutch comprising a rotary shaft having a laterally extending pin, a driven member loosely mounted thereon at one side of said pin and having clutch teeth, a two-part driving member also loosely mounted on said shaft at the opposite side of said pin, one of said members having coöperating clutch teeth and a cam surface and recess for coöperating with said pin, a spring or springs located between said two-part member for maintaining the coöperating clutch teeth in engagement, and means for increasing the resistance of said spring or springs.

13. An overload clutch comprising a rotary shaft having a laterally extending pin, a plurality of loosely mounted members on said shaft, a pair thereof having coöperating clutch faces and located at opposite sides of said pin and one having a recess and a cam surface coöperating with said pin, and means for maintaining said clutch faces in engagement when the pin is in said recess.

14. An overload clutch comprising a rotary shaft having a laterally extending pin, a plurality of loosely mounted members on said shaft, a pair thereof having coöperating clutch faces and located at opposite sides of said pin and one having a recess and a cam surface coöperating with said pin, means for maintaining said clutch faces in engagement when the pin is in said recess, and means for increasing the resistance of said last means.

15. An overload clutch comprising a rotary shaft having a laterally extending pin, a plurality of loosely mounted members located on said shaft, a pair thereof having coöperating clutch teeth and located at opposite sides of said pin, one of said members having a recess and a cam surface coöperating with said pin and said last member also comprising a two-part member, and yieldable means located between said two-part member for maintaining said clutch teeth in engagement when the pin is in said recess.

16. An overload clutch comprising a rotary shaft having a laterally extending pin, a plurality of loosely mounted members located on said shaft, a pair thereof having coöperating clutch teeth and located at opposite sides of said pin, one of said members having a recess and a cam surface coöperating with said pin and said last member also comprising a two-part member, yieldable means located between said two-part member for maintaining said clutch teeth in engagement when the pin is in said recess, and adjustable means also carried by said shaft for increasing the resistance of said compression means.

17. An overload clutch comprising a rotary shaft, means thereon for rotating it, a pin carried by said shaft, a loosely mounted member on said shaft at one side of said pin and having clutch teeth and also having a worm rotatable therewith and a loosely mounted member on said shaft at the opposite side of said pin and having coöperating clutch teeth and a cam surface and recess for coöperating with said pin, a loosely mounted member also on said shaft, a compression spring or springs between said last two members for maintaining said clutch teeth in engagement when the pin is in said recess, and adjustable means also carried by said shaft for increasing the resistance of said spring or springs.

18. An overload clutch comprising a plurality of rotatable members having coöperating clutch faces, means for maintaining a pair of said members normally in contact and the clutch faces in engagement, and means for driving said members when in engagement and for separating the same under an overload and comprising a rotary member, a projecting pin carried thereby and located between said rotatable members, one of said rotatable members and said projecting pin constructed to normally permit the engagement of said rotatable members and to effect the separation thereof under an overload.

19. An overload clutch comprising a plurality of rotatable members having coöperating clutch faces, means for maintaining said clutch faces in engagement, and means for driving said members when in engagement and for separating the same under an overload and comprising a rotary member, a fixed part carried thereby and located between said rotatable members, one of said rotatable members and said fixed part constructed to normally permit the engagement of said rotatable members and to effect the separation thereof under an overload.

20. An overload clutch comprising a plurality of rotatable members having coöperating clutch faces, means for normally maintaining the clutch faces in engagement, and means for driving said members when in engagement and for separating the same under an overload and comprising a rotary shaft extending through said rotatable members and having a laterally projecting pin located between said rotatable members, one of said rotatable members having a cam surface and a recess coöperating with said pin thereby to permit when the pin is within said recess the engagement of the clutch faces of the rotatable members and the separation of such clutch faces when the pin is in engagement with the cam surface.

Signed at Cleveland, in the county of Cuyahoga and State of Ohio.

BENJAMIN FRANKLIN RINDFLEISCH.

Witnesses:
    F. E. BOYCE,
    W. L. BAKELAR.